W. Chicken,
Button-Hole Cutter.
N° 17,725.          Patented July 7, 1857.
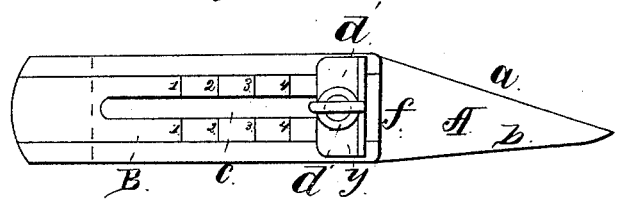
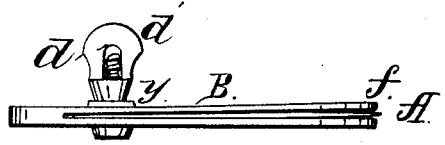
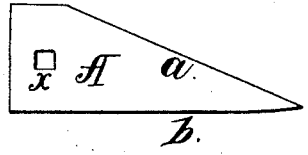
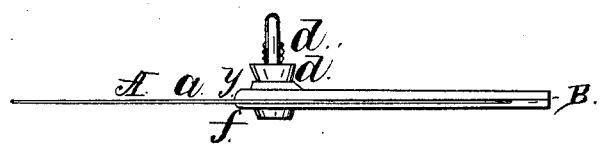
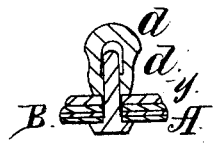

UNITED STATES PATENT OFFICE.

WILLIAM CHICKEN, OF BOSTON, MASSACHUSETTS.

INSTRUMENT FOR CUTTING BUTTONHOLES.

Specification of Letters Patent No. 17,725, dated July 7, 1857.

*To all whom it may concern:*

Be it known that I, WILLIAM CHICKEN, of Boston, in the county of Suffolk and State of Massachusetts, have invented an Improved Buttonhole-Cutter; and I do hereby declare that the same is fully described and represented in the following specification and the accompanying drawings, of which—

Figure 1, is a side view of the said instrument. Figs. 2, and 3, are edge views of the same. Fig. 4, a transverse section taken through the clamp screw.

In such drawings A, denotes a metallic blade or piercer, constructed with its cutting edge $a$, arranged at an acute angle with its back or dull edge $b$, the said edge $b$, being formed so as not to be capable of cutting, except it may be close to the point or vertex of the blade.

Fig 5, represents a side view of the blade or piercer as separate from the gage B, it being applied to the latter in such manner as to be capable of sliding longitudinally therein. This gage has a slot $c$, made through it. A screw $d$, extends through said slot, and a hole $x$, made in the piercer. Such screw moves with the piercer and has a clamp nut $d^1$, applied to it and to screw against an index plate $y$, arranged on it and the gage as shown in Figs. 1 and 4, the whole being so as to enable the gage and piercer to be clamped together as shown in the drawings.

The gage is made as broad if not broader than the knife and has its front end $f$, square to its edges; it is also provided with a scale of numbered divisions as shown in Fig. 1, in order to enable a person to adjust the piercer for cutting a buttonhole of any given length less than the width of the piercer.

In operating with this buttonhole cutter, the point of the piercer is placed against that part of the piece of cloth, where one terminus of the buttonhole is to be formed. The piercer is next to be forced through the cloth until the end of the gage is brought up against the cloth, the length of the buttonhole being determined by the length of the base of the triangular part of the piercer projecting beyond the front edge of the gage. In order to cut a buttonhole of greater length, the piercer should be projected farther from the guard. The nearer the point of the piercer is arranged to the end of the gage, the less will be the length of the buttonhole which can be cut by it. The gage also serves as a handle to the piercer.

I do not claim a spring lancet constructed as represented in J. H. Genrig's patent, dated April 11th, 1846; nor do I claim a buttonhole cutter constructed as shown in the patent of Thomas W. Brown dated May 23rd, 1854 in which the cutting knife is movable relatively to a gage or block, while in the act of cutting a buttonhole in a piece of cloth. In my improved cutter, the angular knife or lance, is stationary relatively to the handle and gage, while it is employed to cut a buttonhole, and said knife is furnished with but one cutting edge arranged at an acute angle with the dull edge as described.

What therefore I claim as a new or improved manufacture is,

My improved buttonhole cutter constructed substantially as hereinbefore described.

In testimony whereof I have hereunto set my signature.

WILLIAM CHICKEN.

Witnesses:
R. H. EDDY,
F. P. HALE, Jr.